(12) United States Patent
Cantemir et al.

(10) Patent No.: US 11,637,469 B2
(45) Date of Patent: Apr. 25, 2023

(54) ELECTRIC MACHINE, TUNED WINDING GEOMETRY AND TECHNOLOGY AND RELATED METHODS

(71) Applicants: Ohio State Innovation Foundation, Columbus, OH (US); Olivia Bruj, Cluj (RO)

(72) Inventors: Codrin Cantemir, Columbus, OH (US); Olivia Bruj, Cluj (RO)

(73) Assignee: OHIO STATE INNOVATION FOUNDATION, Columbus, OH (US)

( * ) Notice: Subject to any disclaimer, the term of this patent is extended or adjusted under 35 U.S.C. 154(b) by 712 days.

(21) Appl. No.: 16/654,829

(22) Filed: Oct. 16, 2019

(65) Prior Publication Data

US 2020/0119610 A1    Apr. 16, 2020

Related U.S. Application Data

(60) Provisional application No. 62/746,233, filed on Oct. 16, 2018.

(51) Int. Cl.
*H02K 3/42* (2006.01)
*G06F 30/17* (2020.01)
*G06F 113/24* (2020.01)
*G06F 119/06* (2020.01)

(52) U.S. Cl.
CPC ............. *H02K 3/42* (2013.01); *G06F 30/17* (2020.01); *G06F 2113/24* (2020.01); *G06F 2119/06* (2020.01)

(58) Field of Classification Search
CPC ...... G06F 30/17; G06F 30/00; G06F 2113/24; G06F 2119/06; G06F 2119/18; G06F 30/10; H02K 3/42

USPC ..................... 310/208; 703/7, 6, 2
See application file for complete search history.

(56) References Cited

U.S. PATENT DOCUMENTS

2004/0212259 A1* 10/2004 Gould ............... H02K 7/14
                                                        310/67 R
2018/0127103 A1   5/2018 Cantemir

FOREIGN PATENT DOCUMENTS

WO    WO-2018155218 A1 *  8/2018  ............ H02K 1/02

OTHER PUBLICATIONS

Chen, Wenliang et al., "Strand-Level Finite Element Model of Stator AC Copper Losses in the High-Speed Machines", IEEE. (Year: 2012).*

(Continued)

*Primary Examiner* — Cedric Johnson
(74) *Attorney, Agent, or Firm* — K&L Gates LLP

(57) ABSTRACT

An example method of producing an electric machine is described herein. The method can include providing the electric machine. The electric machine can include a rotor and a stator, where the stator includes a magnetic core and a stator winding. Additionally, the magnetic core can include a plurality of teeth defining a plurality of slots between adjacent teeth. The stator winding can also include a first portion arranged inside a slot and a second portion arranged outside the slot. The method can further include optimizing, using a computing device, a geometry of the first portion of the stator winding, where the first portion of the stator winding in the provided electric machine has the optimized geometry.

24 Claims, 18 Drawing Sheets

(56) References Cited

OTHER PUBLICATIONS

Du-Bar, Christian et al., "Eddy Current Losses in a Hairpin Winding for an Automotive Application", 2018, IEEE. (Year: 2018).*
Patzak, Adrian et al., "ISCAD—Electric High-Performance Drive for Individual Mobility at Extra-Low Voltage", May 2016, SAE International J. Alt. Power, vol. 5, Issue 1. (Year: 2016).*

* cited by examiner

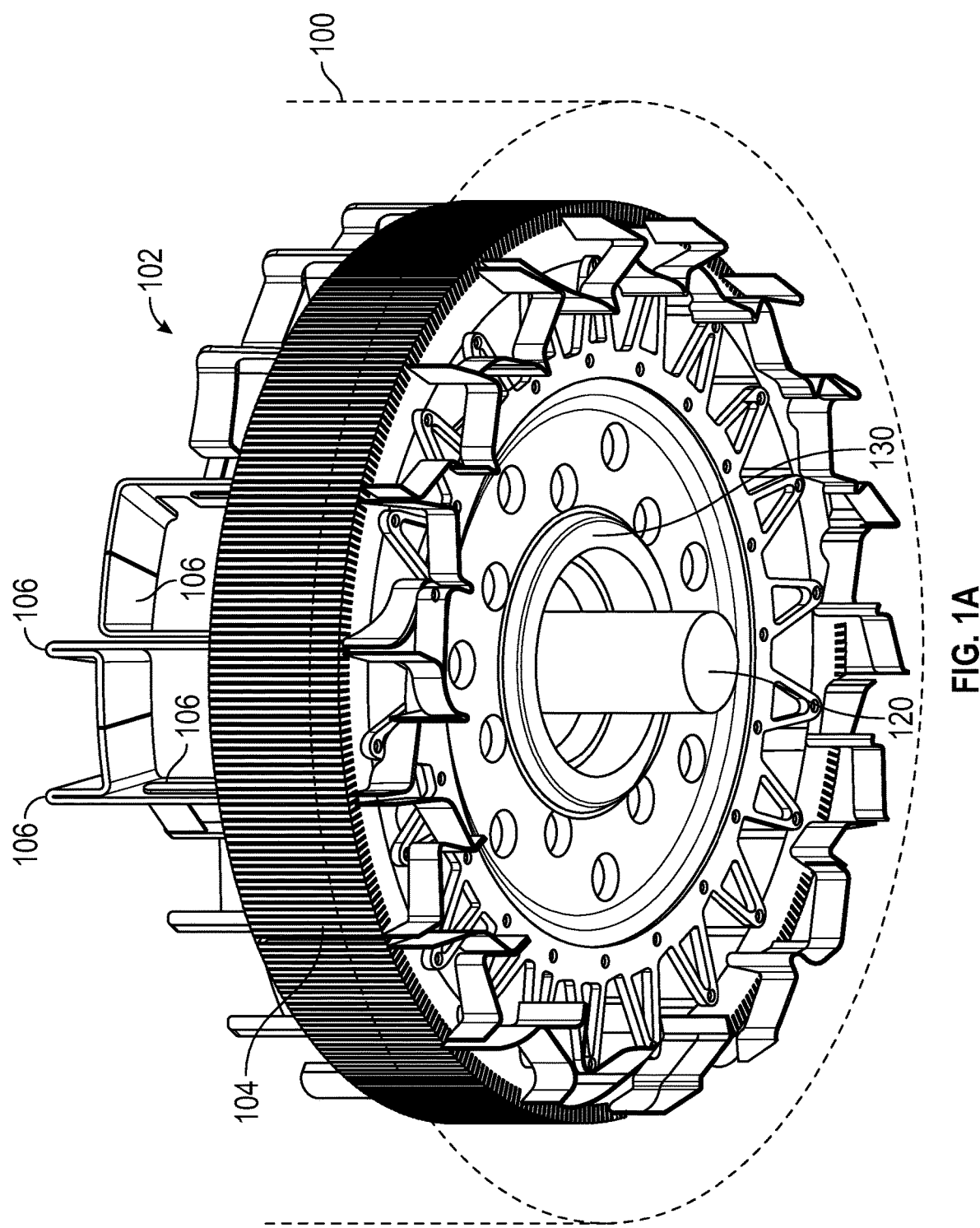

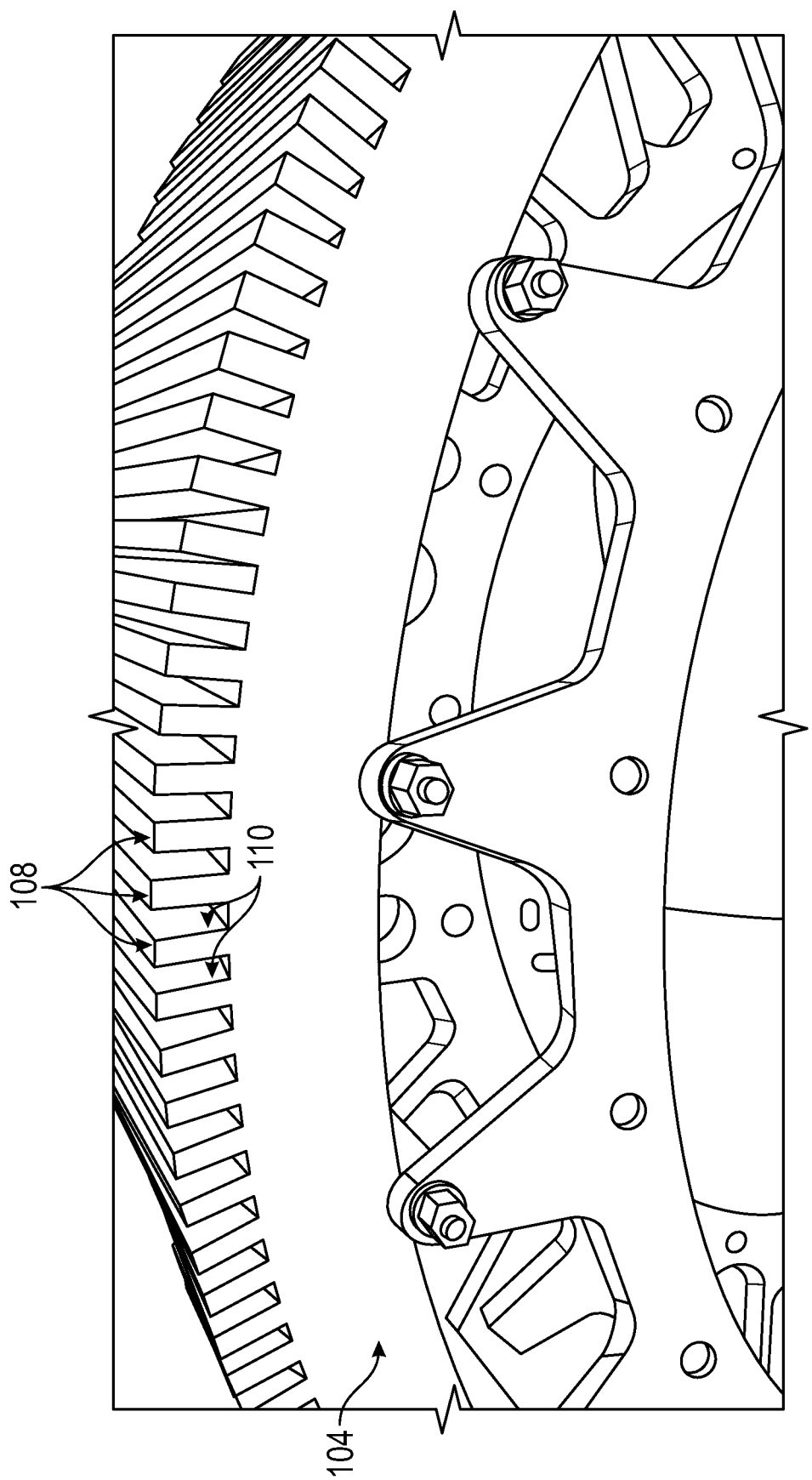

Initial data:

Layer width and slot length:

$w := 11 \cdot 10^{-3}$ m;   $L_s := 30 \cdot 10^{-3}$ m

Resistivity of Aluminum $\rho_{Al} := 2.9 \cdot 10^{-8}$ $\Omega$m

Rezistivity of Aluminium at 120 degrees Celsius $\alpha_{Al} := 4 \cdot 10^{-3} \; \frac{1}{K}$ $\rho_{120} := \rho_{Al} + (120 - 20) \cdot \alpha_{Al} \cdot \rho_{Al}$ $\rho_{120} = 3.6 \times 10^{-8}$ $\Omega$m $\tau_{Al120} := \frac{1}{\rho_{120}} = 1.786 \times 10^{7} \; \frac{1}{S}$ Skin depth of aluminum at 500 Hz:

$\delta_{120} := \frac{1}{\sqrt{\pi \cdot f \cdot \tau_{Al120} \cdot \mu_1}}$ $\delta_{120} = 5.326 \times 10^{-3}$ m Resistance formula:

$R_{ac}(h) := R_{dc}(h) \cdot F_R(h)$ $F_{R1}$-the ac resistance factor

Fig. 9A

Optimization of layers thicknesses at 500 Hz:

*Three turns winding*

Total resistance of the layers:

$$R_{act}(h_1, h_2, h_3) := R_{ac1}(h_1) + R_{ac2}(h_2) + R_{ac3}(h_3)$$

Optimized solution by NCG:

$$\begin{pmatrix} h_{1o} \\ h_{2o} \\ h_{3o} \end{pmatrix} = \begin{pmatrix} 7.124 \times 10^{-3} \\ 4.36 \times 10^{-3} \\ 3.494 \times 10^{-3} \end{pmatrix} [m] \begin{array}{l} \text{-first layer thickness} \\ \text{-second layer thickness} \\ \text{-third layer thickness} \end{array}$$

Initial guessed values [m]:

$$h_{1i} := 0.004$$
$$h_{2i} := 0.003$$
$$h_{3i} := 0.002$$

Total losses formula:

$$P_{ct}(h_1, h_2, h_3) := I_{RMS}^2 \cdot R_{act}(h_1, h_2, h_3)$$

Joule losses percentage deviation:

$$error_p := \frac{P_{ct}(h_{1i}, h_{2i}, h_{3i}) - P_{ct}(h_{1o}, h_{2o}, h_{3o})}{P_{ct}(h_{1i}, h_{2i}, h_{3i})} \cdot 100 = 18.88 \,\%$$

Fig. 9B

Optimization of layer thicknesses at 750 Hz:
Skin depth of Aluminum at 750 Hz:

$$\delta_{120} := \frac{1}{\sqrt{\pi \cdot f \cdot \tau_{Al120} \mu_1}}$$

$$\delta_{120} = 3.703 \times 10^{-3}$$

*Three turns*

Total resistance of the layers:
$$R_{act}(h_1, h_2, h_3) := R_{ac1}(h_1) + R_{ac2}(h_2) + R_{ac3}(h_3) \quad [\Omega]$$

Optimized solution by NCG:

$$\begin{pmatrix} h_{1o} \\ h_{2o} \\ h_{3o} \end{pmatrix} = \begin{pmatrix} 5.817 \times 10^{-3} \\ 3.56 \times 10^{-3} \\ 2.853 \times 10^{-3} \end{pmatrix} [m] \quad \begin{array}{l} \text{-first layer thickness} \\ \text{-second layer thickness} \\ \text{-third layer thickness} \end{array}$$

Total losses formula:
$$P_{ct}(h_1, h_2, h_3) := I_{RMS}^2 \cdot R_{act}(h_1, h_2, h_3) \quad [W]$$

Initial guessed values [m]:

$h_{1i} := 0.004$ $h_{2i} := 0.003$ $h_{3i} := 0.002$

Joule losses percentage deviation:

$$error_p := \frac{P_{ct}(h_{1i}, h_{2i}, h_{3i}) - P_{ct}(h_{1o}, h_{2o}, h_{3o})}{P_{ct}(h_{1i}, h_{2i}, h_{3i})} \cdot 100 = 9.647 \ \%$$

Fig. 9C

ELECTRIC MACHINE, TUNED WINDING GEOMETRY AND TECHNOLOGY AND RELATED METHODS

CROSS-REFERENCE TO RELATED APPLICATIONS

This application claims the benefit of U.S. provisional patent application No. 62/746,233, filed on Oct. 16, 2018, and entitled "ELECTRIC MACHINE, TUNED WINDING GEOMETRY AND TECHNOLOGY," the disclosure of which is expressly incorporated herein by reference in its entirety.

STATEMENT REGARDING FEDERALLY FUNDED RESEARCH

This invention was made with government support under Grant no. NNX14AL87A awarded by the NASA Glenn Research Center. The government has certain rights in the invention.

BACKGROUND

High power and high frequency electric machines having a record low power density will be suitable for electric flight and alike and/or hybridization of big jet engines, albeit the technology may be applied to almost any other category of electric machines.

Generally speaking, increasing the supply frequency of an electric machine is very helpful to decrease its weight and size, however increasing the frequency produces two parasitic effects known as the "Skin Effect" and the "Proximity Effect". For a given wire (current carrier) the intensity of these two effects is proportional to the frequency, however these effects are also dependent to the size and the geometry of the conductors. As a general rule, large conductor sizes are highly affected (negatively) by these two effects. This is the main reason why high frequency currents are used mainly for small size electric machines, while large size electric machines cannot take full advantage of a high frequency supply source.

SUMMARY

An example method of producing an electric machine is described herein. The method can include providing the electric machine. The electric machine can include a rotor and a stator, where the stator includes a magnetic core and a stator winding. Additionally, the magnetic core can include a plurality of teeth defining a plurality of slots between adjacent teeth. The stator winding can also include a first portion arranged inside a slot and a second portion arranged outside the slot. The method can further include optimizing, using a computing device, a geometry of the first portion of the stator winding, where the first portion of the stator winding in the provided electric machine has the optimized geometry.

In some implementations, the optimized geometry minimizes alternating current (AC) resistive loss of the electric machine.

In some implementations, the step of optimizing the geometry of the first portion of the stator winding includes computing AC resistance, wherein the optimization considers one or more parasitic effects. The one or more parasitic effects include a skin effect and/or a proximity effect.

In some implementations, the AC resistance is calculated using the Dowell approach.

In some implementations, the step of optimizing the geometry of the first portion of the stator winding further includes using the nonlinear conjugate gradient (NCG) method to find the optimized geometry with a lowest AC resistive loss.

In some implementations, the geometry of the first portion of the stator winding is optimized for a given number of layers of the first portion of the stator winding. For example, the optimized geometry is a layer thickness of the first portion of the stator winding. Alternatively or additionally, the geometry of the first portion of the stator winding is optimized for a given conductive material. Alternatively or additionally, the first portion of the stator winding comprises a plurality of layers, each layer having a different size.

In some implementations, the geometry of the first portion of the stator winding is optimized for a given power supply frequency.

An example computer-implemented method for designing an electric machine is also described herein. The electric machine can include a rotor and a stator, where the stator includes a magnetic core and a stator winding. Additionally, the magnetic core can include a plurality of teeth defining a plurality of slots between adjacent teeth. The stator winding can also include a first portion arranged inside a slot and a second portion arranged outside the slot. The method can include receiving one or more parameters for the electric machine; and optimizing a geometry of the first portion of the stator winding. The optimized geometry minimizes alternating current (AC) resistive loss of the electric machine. The step of optimizing the geometry of the first portion of the stator winding includes computing AC resistance, where the optimization considers one or more parasitic effects that include a skin effect and/or a proximity effect.

An example electric machine is also described herein. The electric machine can include a rotor and a stator. The stator can include a magnetic core and a stator winding, where the magnetic core includes a plurality of teeth defining a plurality of slots between adjacent teeth. The stator winding includes a first portion arranged inside a slot and a second portion arranged outside the slot, where a geometry of first portion of the stator winding is optimized for a power supply frequency.

It should be understood that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

FIG. 1A is a perspective view of an electric machine according to an implementation described herein.

FIG. 2 is a detail view of teeth and stator slots in an electric machine according to an implementation described herein.

FIG. 9A illustrates the initial values. FIG. 9B shows layer thickness optimization for 500 Hz. FIG. 9C shows layer thickness optimization for 750 Hz.

DETAILED DESCRIPTION

Figure 1B:
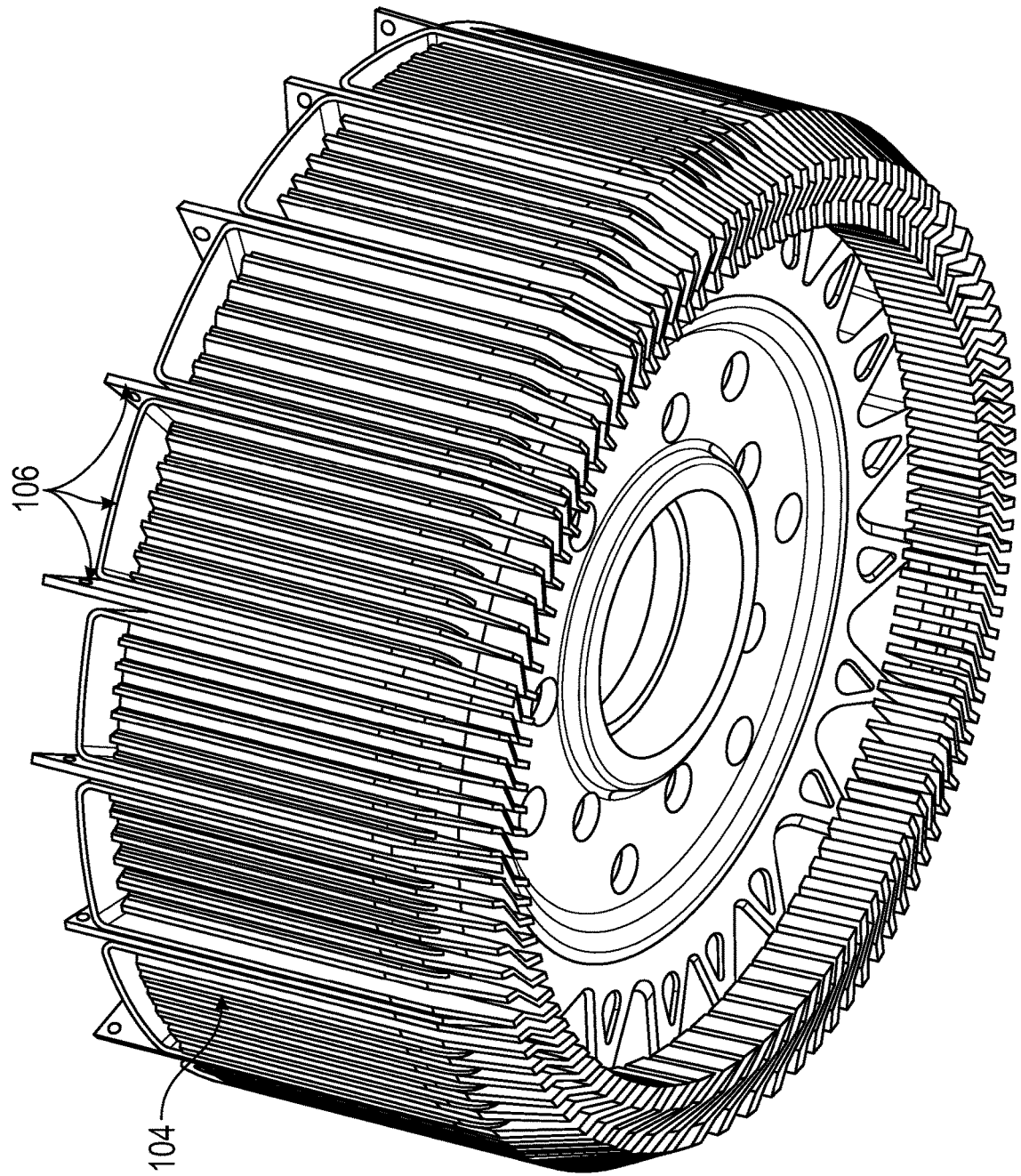
FIG. 1B is a perspective view of an electric machine according to an implementation described herein.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. While implementations will be described for an electric motor, it will become evident to those skilled in the art that the implementations are not limited thereto, but are applicable for any other electric machine.

As described above, increasing the supply frequency of an electric machine is helpful to decrease its weight and size. But, increasing the supply frequency produces two parasitic effects known as the "Skin Effect" and the "Proximity Effect". These two parasitic effects typically have significant effects on large sized conductors. Because of such parasitic effects, high frequency currents are typically used for small size electric machines. Large size electric machines often cannot take full advantage of a high frequency supply source. Electric machines, tuned windings, and related methods that consider such parasitic effects are described herein. In some implementations, stator windings (e.g., conductors) with specific geometry as described herein are referred to as tuned coils or tuned windings. In some implementations, tuned coils or windings optimize performance of electric machines for high frequency currents. The geometry of the tuned coils described herein are able to highly decrease the skin and the proximity effects. A method is also described herein that enables the determination of an optimum geometry for each particular application, including full practicability for Megawatt class electric machines. Additionally, the machines described herein can be formed with low cost fabrication technology and minimal usage of fabrication materials. This disclosure contemplates that the tuned coils and related methods can also be used in various other, non-high frequency supply current applications.

A stator winding can comprise or more loops of material (e.g., conductors). Such loops are sometimes referred to as turns or layers. Uneven distribution of energy losses among the loops of a coil may be positively addressed by a tuned coil. For example, the first turn of a tuned coil is exposed only to its own field, in contrast to the last turn which is exposed to the total field. Because of this discrepancy in the exposure of the turns, the first turn may have a thicker width than the last turn (e.g., regressive thicknesses) and as such energy losses may decrease. This specific in geometry is able to highly decrease the skin and the proximity effects.

To facilitate minimum losses for a high frequency winding, it may be beneficial that the size and the geometry of a current carrier varies substantially for the part of the conductor located inside the slot in comparison to the part of the conductor located outside of the slot. The part of the conductor outside of the slot is sometimes referred to as the frontal part. This variation of size and geometry can vary in accordance with the different electromagnetic field distribution in each region of the electric machine. It should be understood that the vast majority of the electric machine do not use include coils of different geometries inside and outside the slot, but typically a constant cross section conductor. Thus, a tuned winding is by default a variable cross section (VCS) winding. As described herein, the variation of size and geometry of a winding, as well as elongation of a stator slot, can provide gains in electric motor efficiency.

In some implementations, it may be desirable to implement a tall and thin conductor for the outside part of the winding (i.e., the frontal parts), while inside the slot, the optimum arrangement is highly antagonistic with very short (small height) bars and as wide as practical. This disclosure contemplates that tall and thin conductor used outside of the slot will be a good current carrier with minimal losses occurring at a geometric thickness close to half of the penetration depth. For example, if aluminum is considered, then at 750 Hz the optimum geometric thickness for the windings outside of the slot is anywhere between 1.5 mm to 1.8 mm with a convenient practical implementation of 1.6 mm (1/16") due to its availability. Additionally, the external conductors may be as tall as it is practical to implement. A taller conductor will have smaller losses due to an increased useful cross section, however a taller conductor will also increase the equivalent length per turn and over a given value, so there might be no gains at all (depending on geometry). In one implementation, using a conductor taller than 50 mm has no practical benefits anymore, albeit it might help the heat transfer. It was also found that if the conductor thickness increases up to the penetration depth, then the conductor may be as tall as 30 mm, somehow the maximum cross section of the conductor outside the slot remaining constant for minimum losses, albeit that the thinner implementation is slightly more efficient.

Figure 4A:
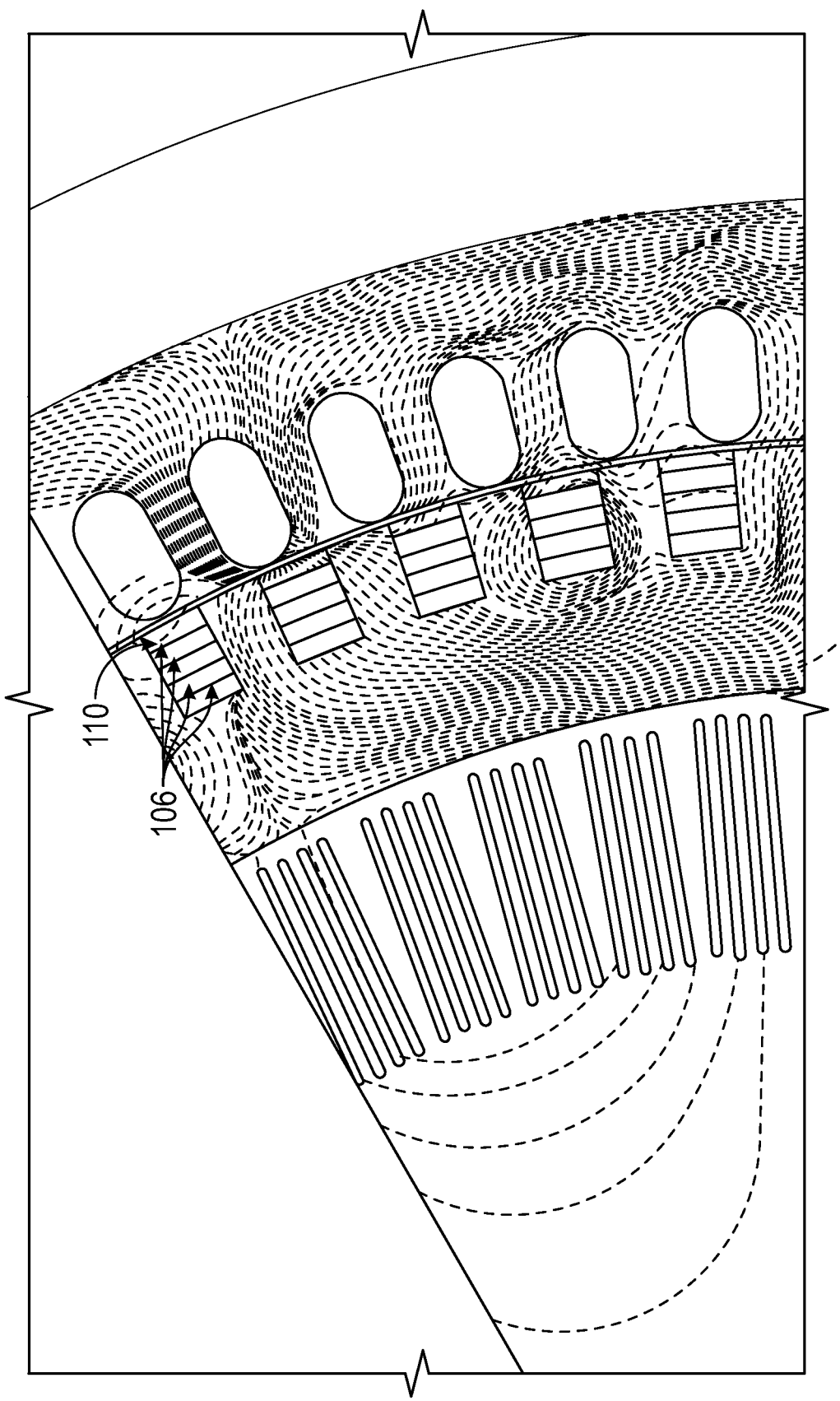
FIG. 4A illustrates an electromagnetic simulation of eddy currents in the machine having no elongated slots according to an implementation described herein.
Figure 4B:
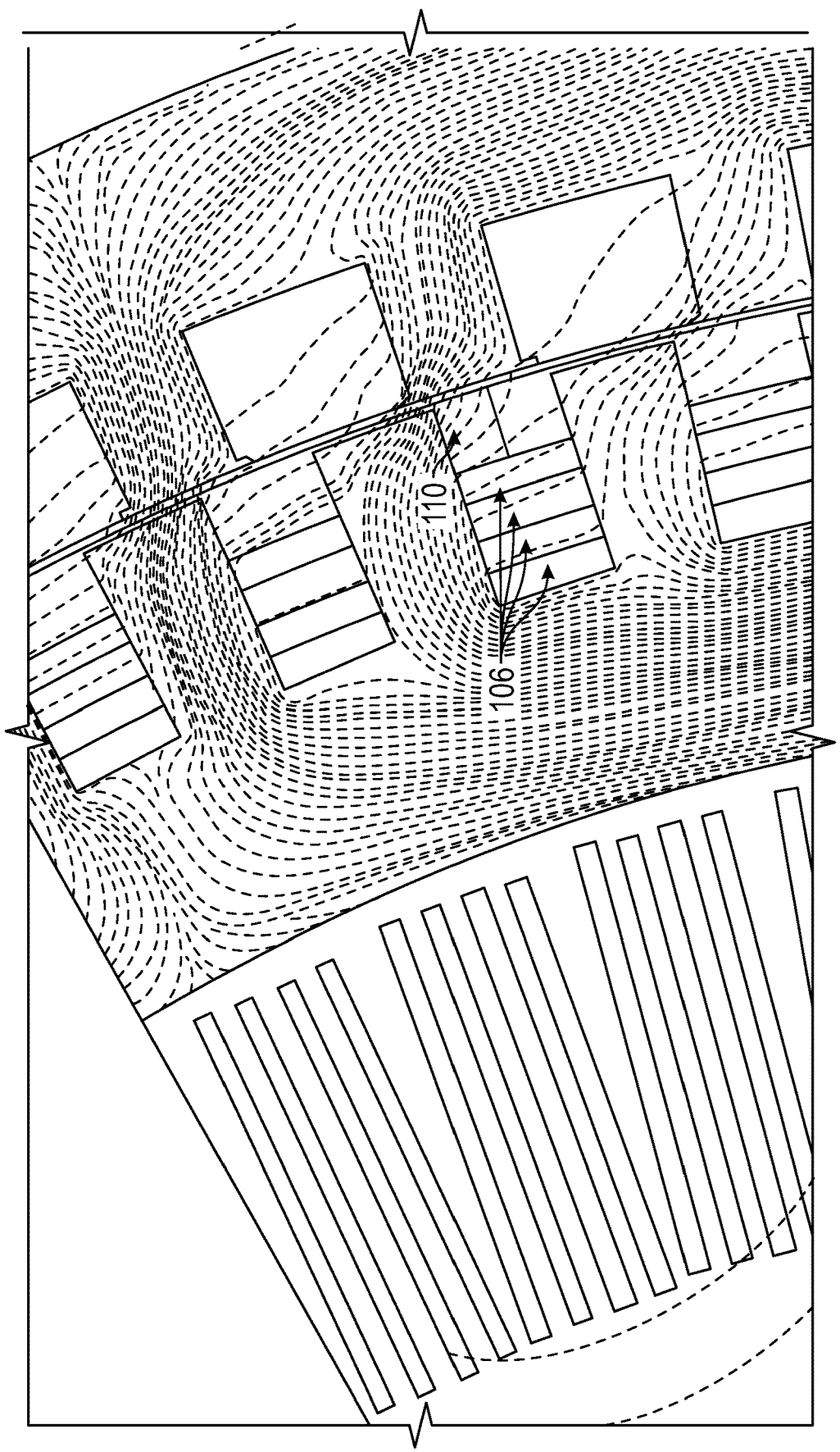
FIG. 4B illustrates an electromagnetic simulation of eddy currents in the machine having elongated slots according to an implementation described herein.

Losses in overall power efficiency can decrease as the length of a stator slot is elongated, even when elongated beyond the length needed to accommodate the windings in the slot. In some electrical machines, most of the losses concentrated in the conductors located in the top of the slot are generated by the secondary magnetic flux leaving the side of the teeth defining the stator slots, and going towards the rotor. This flux is typically calculated with Carter's formula and its effect is a magnetic airgap smaller than the geometric airgap. However, the secondary flux intersects the flat conductors and induces eddy currents/loop currents in the body of the conductors located inside the slot. As such, in some implementations which avoid the intersection between the secondary flux and the conductor's efficiency losses are decreased substantially. FIGS. 4A-4B below show the flux distribution with and without slot elongation.

Figure 1C:
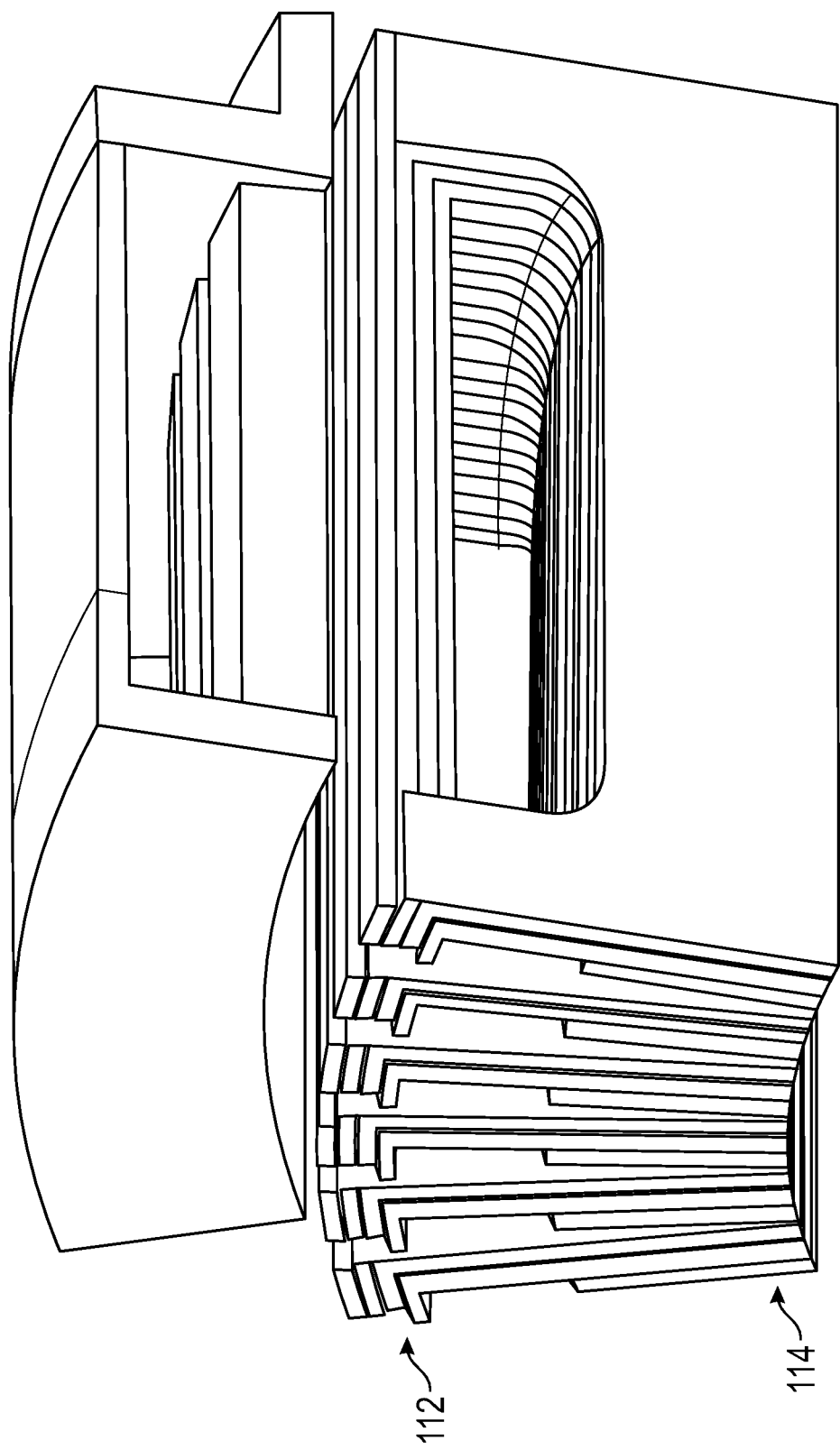
FIG. 1C illustrates an electromagnetic simulation of an electric machine having a 4 turns/slots configuration according to an implementation described herein.

Referring to FIGS. 1A-1C, an electric machine where the electric machine has a rotor 100 and a stator 102 is shown. It should be understood that this figure illustrates an example system. Implementations of the electric machine can be other than those shown in the examples. In some implementations, the rotor 100 is a body disposed around the stator 102. Optionally, the rotor 100 and stator 102 are concentric. In some implementations, the rotor 100 is disposed around the stator 102 such that the rotor 100 and the stator 102 are coaxial. In some implementations, the rotor 100 is an induction rotor, a permanent magnet rotor, or a squirrel cage rotor. The stator 102 has a magnetic core 104 and a stator winding 106. In some implementations, the electric machine includes a rotor shaft 120 and a hub 130. The hub 130 is disposed around a rotor shaft 120. The hub 130 is circular, or disk shaped. As shown in FIG. 2, the magnetic core 104 also has a has a plurality of teeth 108 disposed around and protruding outwardly from the edges of the magnetic core 104. The plurality of teeth 108 define a plurality of slots 110 between adjacent teeth 108. The slots 110 can be elongated such that the distance is greater than the minimum required to accommodate the coils. In some implementations, the elongation size is one order of magnitude larger than the airgap size, case by case. In some implementations, the elongation size is a same order of magnitude with teeth width. In some implementations, the teeth 108 are distributed evenly around the circumference of the magnetic core 104.

Figure 3:
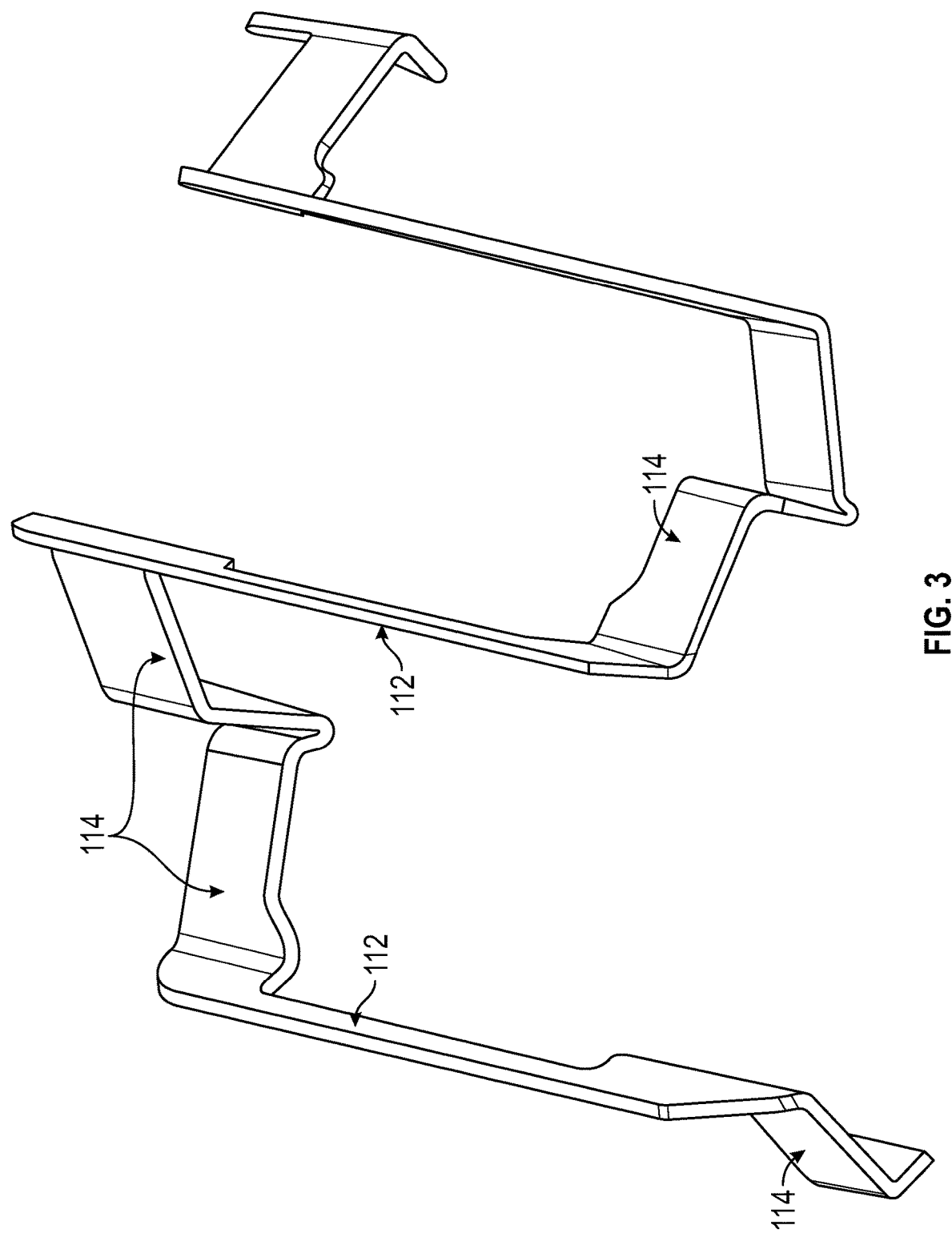
FIG. 3 is a perspective view of first and second portions of a stator winding (also referred to herein as "bobbins") according to an implementation described herein.

Referring again to FIGS. 1A-1C, the electric machine also includes a stator winding 106. In some implementations, the stator winding 106 is a current carrier and can be made of any material capable of carrying an electrical current. In some implementations the stator winding 106 is a metal winding of copper or aluminum. In some implementations described herein, the stator winding has one turn/slot (see e.g., FIGS. 1A, 1B, 10A, 10B). In other implementations, the stator winding has a plurality of turns/slot (see e.g., FIGS. 4A, 4B, 5). As shown in FIG. 3, the stator winding includes a first portion 112 and a second portion 114. Each first portion 112 is arranged and disposed inside a slot. Each second portion 114 is arranged and disposed outside a slot (i.e., the frontal part). The stator winding is looped in a repeated pattern such that each loop defines a turn in the stator winding. The loops are sometimes referred to herein as layers. In some implementations, the first portion 112 of the stator winding 106 is optimized for a power supply frequency. In some implementations, the size and geometry of the stator winding varies substantially for a first part of the conductor located inside the slot (e.g., first portion 112) in comparison to the part of the conductor located outside the slot (e.g., second part 114). The variation of size and geometry is in accordance with the different electromagnetic field distribution in each region of the electric machine. In some implementations, the geometry of the first portion 112 of the stator winding includes size, shape, number of layers, number of windings, or any combination of these parameters. In some implementations the second portion 114 of the winding is thinner than the first portion 112 of the winding. That is to say that a layer thickness of the first portion 112 of the stator winding 106 is greater than a layer thickness of the second portion 114 of the stator winding. In some implementations second portion 114 is a widened and thin conductor in comparison to the first portion 112. In other words, the second portion 114 has a larger cross section as compared to the first portion 112. The first portion 112 can be highly antagonistic with very short and wide bars. In some implementations, the width of the first portion 112 is as wide as possible within the size parameters of the electric machine and a given application. A widened and thin conductor used outside of the slot can be a good current carrier with minimal losses occurring at a geometric thickness close to half of the penetration depth into the slot. As such, a layer thickness of the second portion 114 of the stator winding 106 can be about half of a current penetration depth. In some implementations, a layer width of the first portion 112 of the stator winding is less than a layer width of the second portion 114 of the stator winding 106. The penetration depth can define the distance from an outer edge of the slot to the bottom of the slot 110, and define the area of the slot that a winding is disposed in. In some implementations the penetration depth varies in relation to the frequency and material used as shown in FIGS. 9A-9C and as described below. For example, in some implementations, the windings are made of aluminum. In such implementations, at 750 Hz, the optimum geometric thickness for the circuits outside of the slot is between 1.5 mm and 1.8 mm. In some implementations the geometric thickness for circuits outside of the slot is 1.6 mm.

Referring again to FIGS. 1A-1C, in some implementations, the electric machine is configured to operate with a power supply that is a high frequency power supply. In some implementations, the power supply operates at about 400 Hertz (Hz) or greater, for example, at 500 Hz or 750 Hz. In some implementations, the power supply operates at about 1,000 Hz or greater. It should be understood that the optimization techniques described herein can be applied to machines operating at any frequency, including common industrial power supply frequencies of 50 or 60 Hz. In some implementations the stator 102 is paired with an induction rotor such as external squirrel cage rotor, a permanent magnet rotor or any other suitable rotor configuration without any principal modifications to the topology.

In some implementations the magnetic core 104 can be mounted to the supports by means of bolts and nuts. In some implementations, the two supports are different geometry in order to minimize eddy current losses and to compensate for the stack geometry variation. In a conventional configuration, increasing the length of the slots may increase the weight substantially due to the fact that both the teeth 108 and the yoke would have an increased geometry. In some implementations, the optimum slot height is determined by iterative simulations. The simulations consider various values of secondary flux and transversal or leakage flux. In some implementations, the optimum elongation is 4 mm. In some implementations, the magnetic core 104 is formed from a permanent magnet. In some implementations the magnetic core 104 is a ferromagnetic material such as iron, cobalt, nickel, or any other material capable of holding or conducting a magnetic field. FIG. 1C illustrates an implementation which uses a configuration of 4 turns/slots with thin horizontal conductors in the slot (element 112) and tall vertical conductors (element 114) outside of the slot. Note that the cross section of the winding outside of the slot may also vary based on the space opportunity available. The shading scale depicts the current density from minimum to maximum. This configuration (showed that high power high frequency machine may be developed around the principle of VCS.

FIG. 2 shows the magnetic core 104 with teeth 108 defining a slots 110 between the teeth 108. It should be understood that this figure illustrates an example system. Implementations of teeth 108 and slots 110 can be other than those shown in the examples. The teeth 108 define a plurality of the slots 110 between adjacent teeth 108. The slots 110 are configured to be longer than a typical slot 110 length to accommodate the stator windings 106. The increased slot 110 length contributes to decreasing losses in efficiency. This is illustrated in FIGS. 4A-4B.

Referring to FIG. 3 an example of a tuned stator winding 106, or tuned coil is shown. It should be understood that this figure illustrates an example system showing, and that the stator winding 106 can be other than those shown in the examples. In some implementations, a regression in size of stator winding 106 is correlated with the elongation of the slot 110 and depends on the materials of choices and the frequency. In some implementations, the stator windings 106 include individual half windings, e.g., first portion 112 and second portion 114. These are also referred to herein as "bobbins". In some implementations, there are only two types of half bobbins repeated evenly—the first portion 112 and the second portion 114. The half bobbins are relatively similar, having a narrow bar (first portion 112) for positioning within the slot and large second portions (second portion 114) to carry the current outside of the slots.

Referring to FIGS. 4A-4B below, the flux distribution with and without slot 110 elongation are shown. FIG. 4B illustrates a more optimized flux distribution in comparison to the flux distribution in utilizing non-elongated slots. Particularly on an internal stator/external rotor configuration the slot elongation has a minor weight toll (longer teeth but shorter yoke) but on a conventional configuration such solution may increase substantially the weight due to the fact that both the teeth and the yoke will have an increased geometry. The optimum slot height may be determined by iterative simulations and in principle consists in a compromise between the secondary flux and the (transversal) leakage flux (for reference the optimum elongation was found approx. 4 mm). Methods for achieving such optimization and determining the proper parameters for elongated slots as shown in these example implementations are described in FIG. 5 and in the discussion below.

Figure 5:
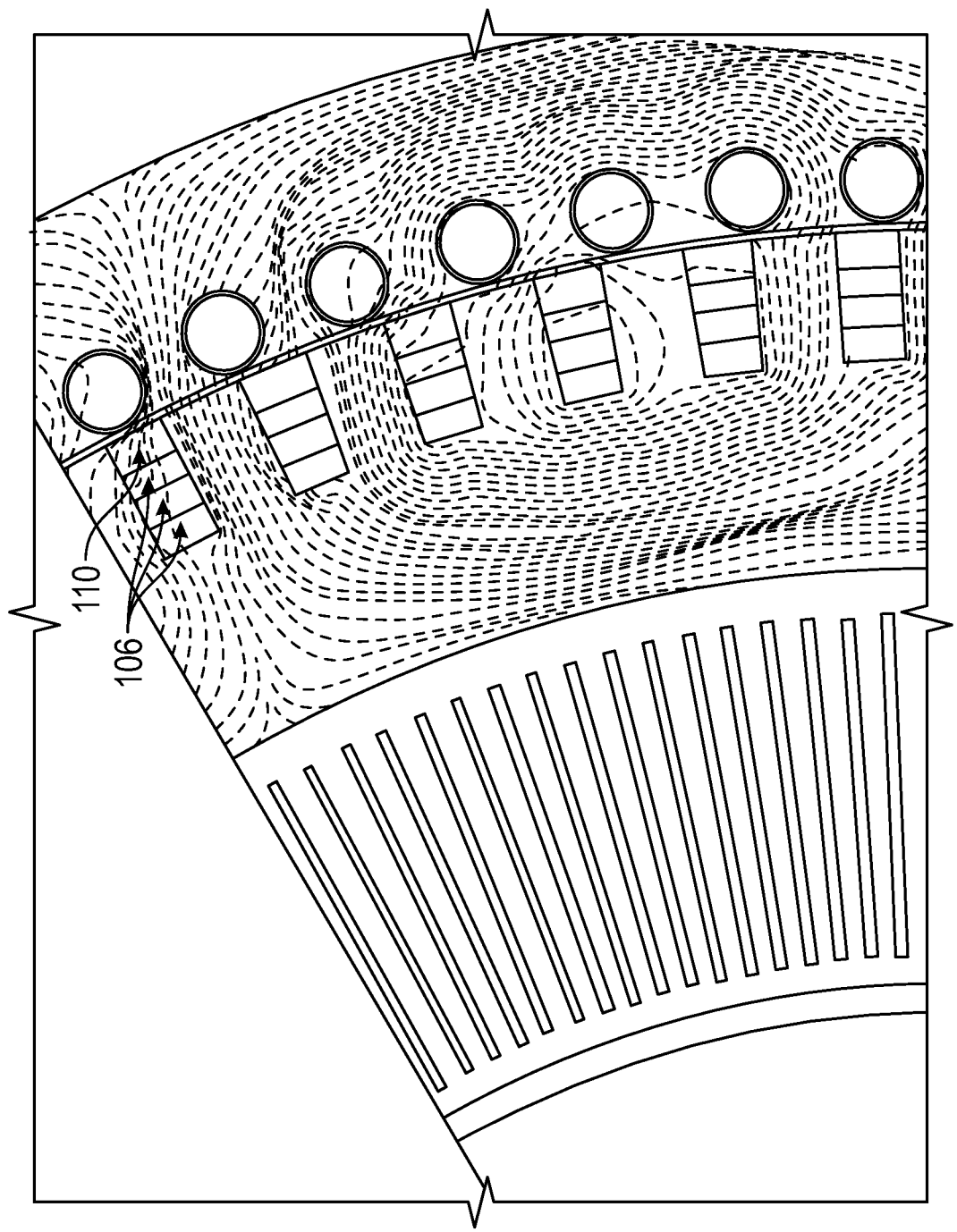
FIG. 5 illustrates an electromagnetic simulation of an electric machine having 3 turns per slot with regressive thickness according to an implementation described herein.

Referring to FIG. 5, the flux distribution with regression of conductor thickness is shown. In FIG. 5, the stator winding 106 and slot 110 are labeled. As shown in FIG. 5, the thickness of the layers of the stator winding 106 is regressive, e.g., first layer thicker than second layer which is thicker than third layer. It should be understood that the number and/or thicknesses of the layers shown in FIG. 5 are provided only as examples. Uneven distribution of losses among the turns of a coil may be positively addressed and implemented. Basically, because the first turn is exposed only to its own field (versus the last turn which is exposed to the total field) the first turn may be taller (thicker) than the last turn and hence the joule losses may decrease. As shown in FIG. 5, with 3 turns per slot, each turn (e.g., 3 turns per slot) has a regression of the conductor thickness from the first turn to the last turn. Such regression in size can be correlated with the elongation of the slot and depends on the materials of choices and of course the frequency.

Figure 6:
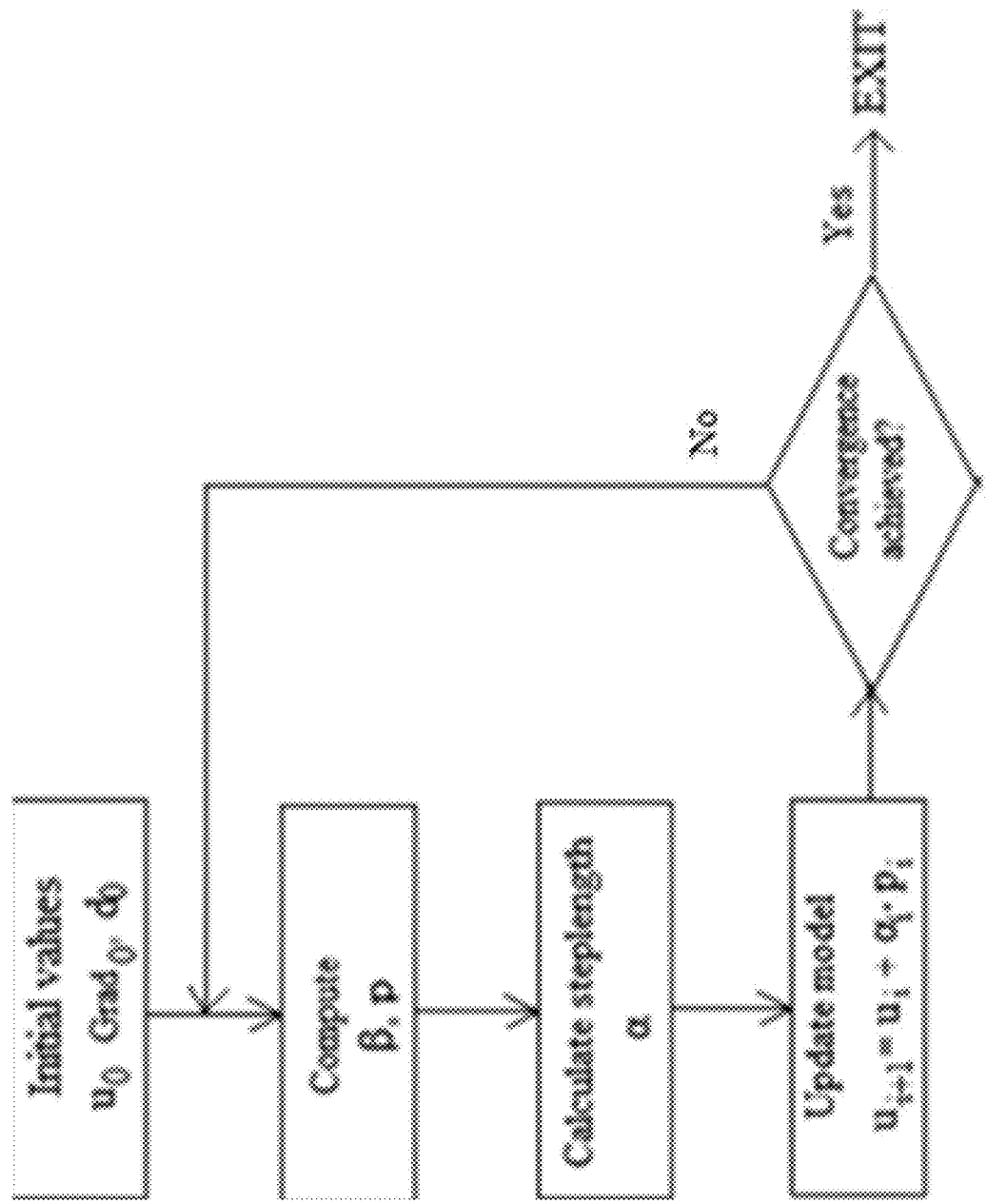
FIG. 6 shows a flow chart of a method of producing an electric machine.

Referring to FIG. 6, a process for designing an electric machine is shown. This disclosure contemplates that the process shown in FIG. 6 can be implemented using a computing device (e.g., computing device of FIG. 8). In some implementations, the AC Resistance is computed using the Dowell approach where both skin effect and proximity effect are considered. The Dowell approach is a known technique or calculation for determining losses. The Dowell approach is designed to reliably predict the increased resistance in the windings of foil and round conductors applied to transformers. The closed expression of the AC resistance calculation shows that the dimensions of the conductors placed in the slot have a major influence on the total losses in efficiency. The expression of the AC resistance is non-linear and therefore the Nonlinear Conjugate Gradient (NCG) method represents an optimization method. The NCG method is a known technique for the numerical optimization of nonlinear problems with low memory requirements. The method is widely used to find the minimum of a nonlinear function using its gradient. After applying a sequence of conjugate directions the optimal location is found by successive approximations:

$$u^{i+1} = u_i + a_i d_1$$

The step length, a is refined at each iteration by an exact line search technique and d is in the direction of the gradient. In an example implementation shown in FIGS. 9A-9C, aluminum coiled in one turn per layer and up to three layers have been considered. The computations have focused on two frequencies: 500 Hz and 750 Hz. To each layer a thickness variable was assigned. All conductors were connected in series. The resistivity of Aluminum at 120 degrees Celsius has been used in the implementation. It should be understood that the material (aluminum), the number of turns and/or layers (1 turn per layer up to three layers), and frequencies (500 and 750 Hz) are provided only as examples. This disclosure contemplates that optimization can be performed using other materials and/or conductor geometries.

Figure 7A:
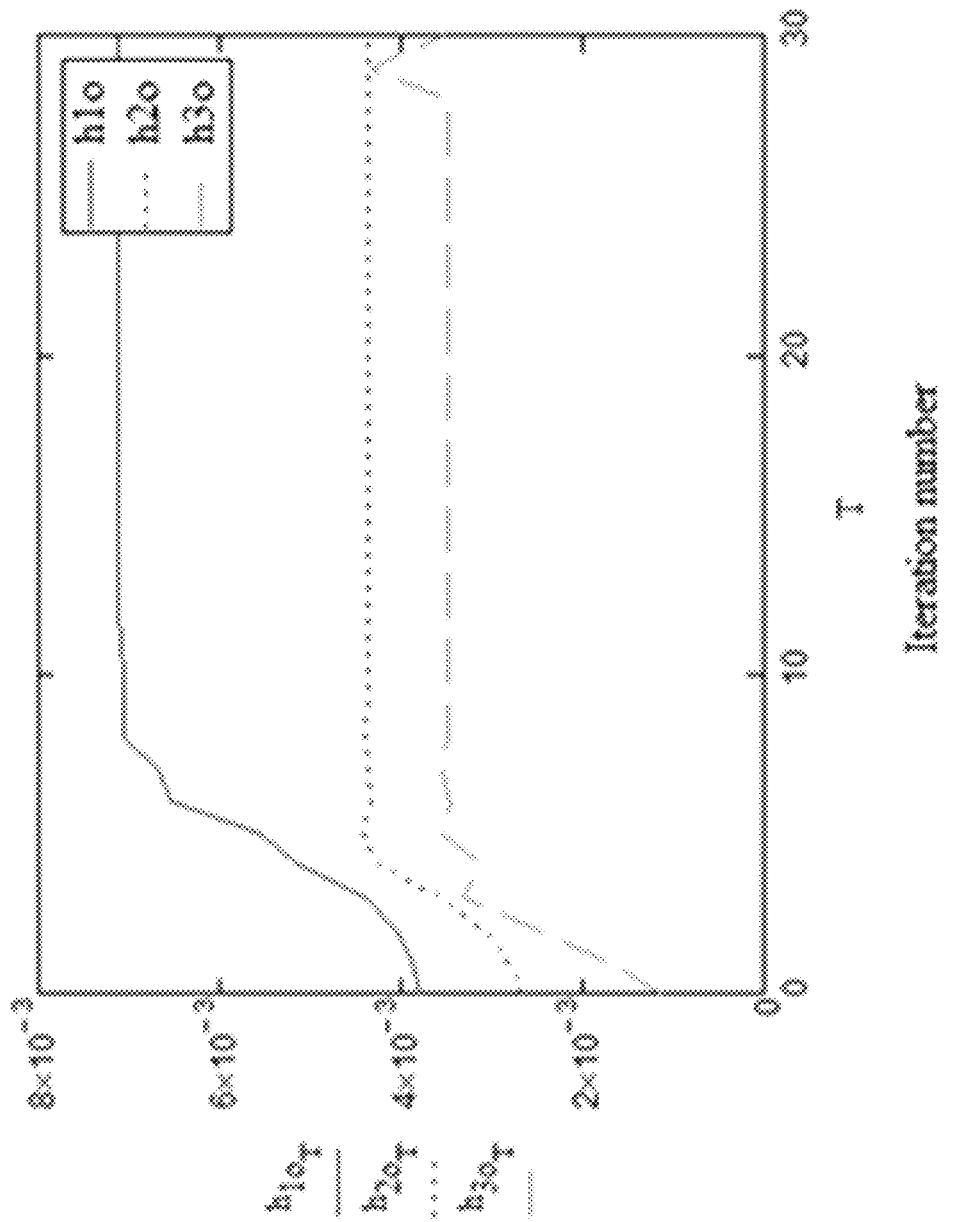
FIG. 7A shows a first convergence graphic of an Nonlinear Conjugate Gradient algorithm for three layers at 500 Hz.
Figure 7B:
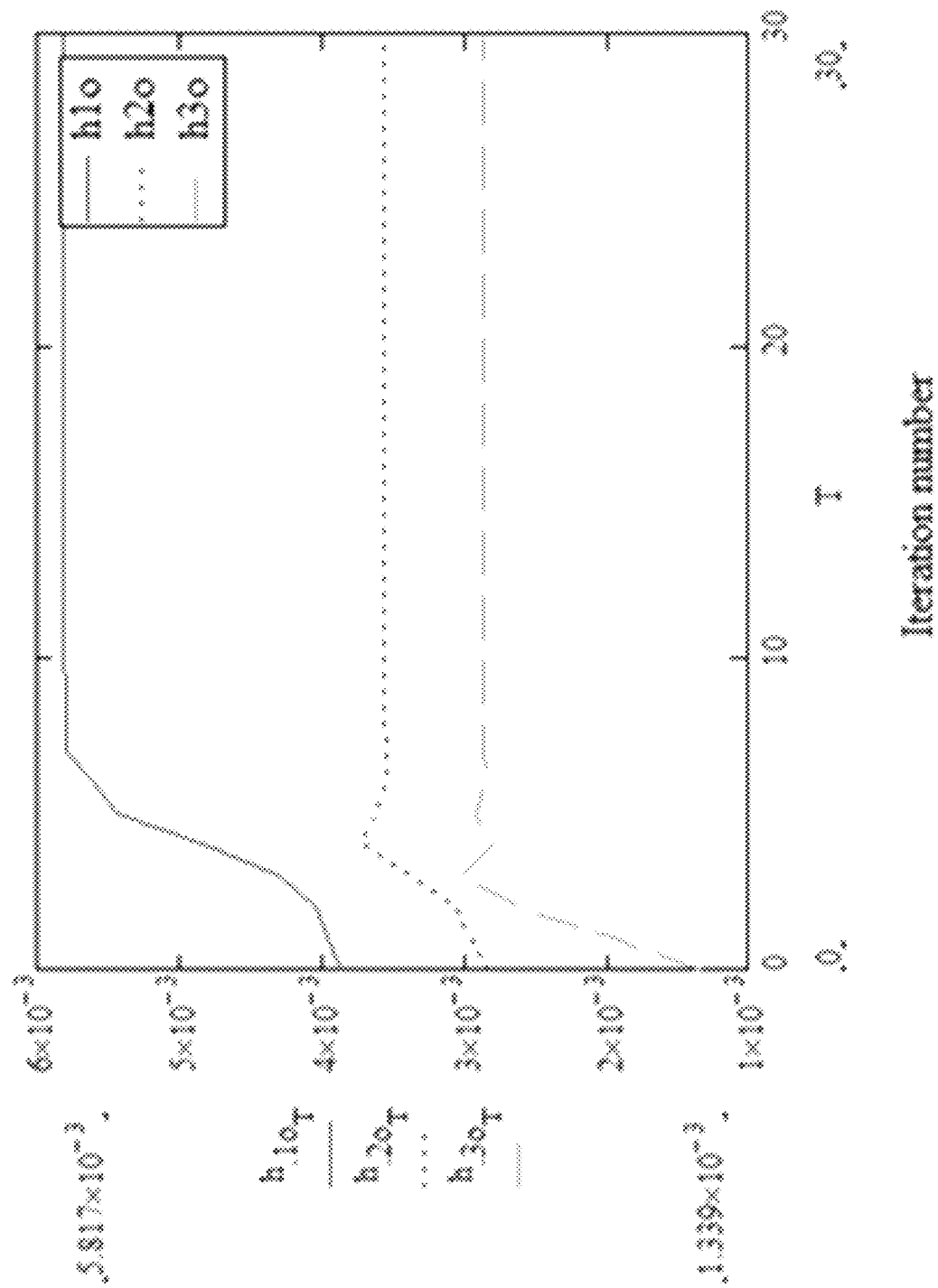
FIG. 7B shows a second convergence graphic of an Nonlinear Conjugate Gradient algorithm for three layers at 750 Hz.

The results of the computations are shown in FIGS. 9A-9C for each particular case. FIG. 9A illustrates the initial values. FIG. 9B shows layer thickness optimization for 500 Hz. A convergence graphic of NCG algorithm for three layers at 500 Hz is shown in FIG. 7A. FIG. 9C shows layer thickness optimization for 750 Hz. A convergence graphic of NCG algorithm for three layers at 750 Hz is shown in FIG. 7B. A validation has been performed using Newton-Gauss solver.

The percent deviation between the initial values and optimized values have been indicated for each case and a maximum of 21% have been reached. The Nonlinear Conjugate Gradient method has a fast convergence. The solution was obtained in less than 20 iterations and the NCG algorithm convergence was not influenced by the initial guess values. In some implementations a regression size is correlated with the elongation of the slot 110. This regression can also depend on the materials and the frequency used.

An example method of producing an electric machine is also described herein. The method can include providing the electric machine, which can be an electric machine as described herein (see e.g., FIG. 1A-1C or 10A-10-B). The electric machine can include a rotor and a stator, where the stator includes a magnetic core and a stator winding. Additionally, the magnetic core can include a plurality of teeth defining a plurality of slots between adjacent teeth (see e.g., FIG. 2). The stator winding can also include a first portion arranged inside a slot and a second portion arranged outside the slot (see e.g., FIG. 1A-1C, 3, or 10A-10-B). The method can further include optimizing, using a computing device, a geometry of the first portion of the stator winding, where the first portion of the stator winding in the provided electric machine has the optimized geometry.

An example method for designing an electric machine is also described herein. The electric machine can include a rotor and a stator, where the stator includes a magnetic core and a stator winding. Additionally, the magnetic core can include a plurality of teeth defining a plurality of slots between adjacent teeth (see e.g., FIG. 2). The stator winding can also include a first portion arranged inside a slot and a second portion arranged outside the slot (see e.g., FIG. 1A-1C, 3, or 10A-10-B). The method can further include receiving one or more parameters for the electric machine, and optimizing a geometry of the first portion of the stator winding.

In some implementations, the optimized geometry minimizes alternating current (AC) resistive loss of the electric machine. For example, the step of optimizing the geometry of the first portion of the stator winding comprises computing AC resistance, wherein the optimization considers one or more parasitic effects (e.g., skin and/or proximity effects). The AC resistance is calculated using the Dowell approach. Additionally, the step of optimizing the geometry of the first portion of the stator winding further comprises using the nonlinear conjugate gradient (NCG) method to find the optimized geometry with a lowest AC resistive loss.

In some implementations, the optimized geometry is a layer thickness of the first portion of the stator winding (see e.g., FIG. 5). In some implementations, the geometry of the first portion of the stator winding is optimized for a given conductive material. In some implementations, the geometry of the first portion of the stator winding is optimized for a given number of layers of the first portion of the stator winding (see e.g., FIG. 5). In some implementations, the geometry of the first portion of the stator winding is optimized for a given power supply frequency.

It should be appreciated that the logical operations described herein with respect to the various figures may be implemented (1) as a sequence of computer implemented acts or program modules (i.e., software) running on a computing device (e.g., the computing device described in FIG. 8), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 8:
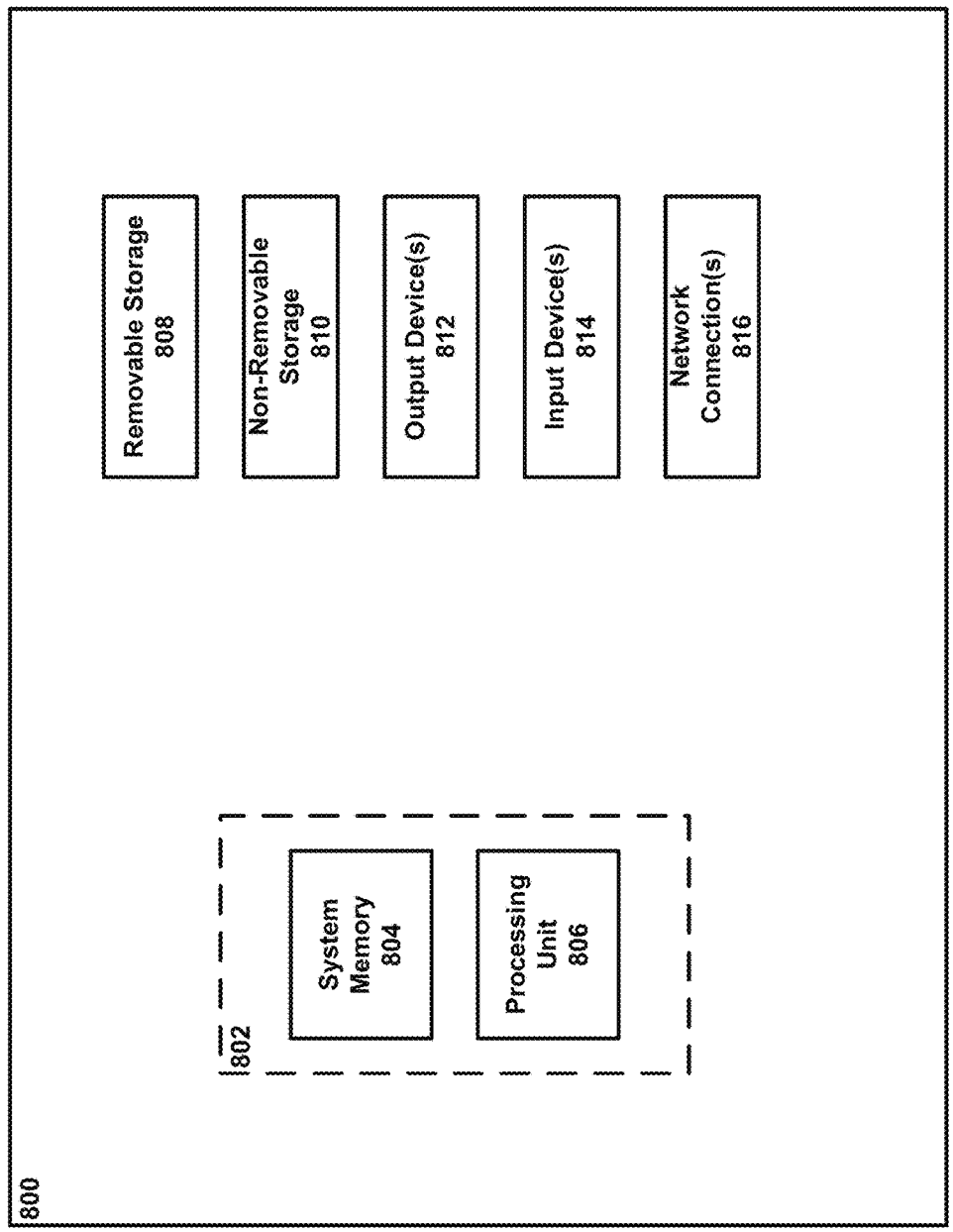
FIG. 8 shows an example computing device.

Referring to FIG. 8, an example computing device 800 upon which the methods described herein may be implemented is illustrated. It should be understood that the example computing device 800 is only one example of a suitable computing environment upon which the methods described herein may be implemented. Optionally, the computing device 800 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In its most basic configuration, computing device 800 typically includes at least one processing unit 806 and system memory 804. Depending on the exact configuration and type of computing device, system memory 804 may be volatile (such as random access memory (RAM)), non-volatile (such as read-only memory (ROM), flash memory, etc.), or some combination of the two. This most basic configuration is illustrated in FIG. 8 by dashed line 802. The processing unit 806 may be a standard programmable processor that performs arithmetic and logic operations necessary for operation of the computing device 800. The computing device 800 may also include a bus or other communication mechanism for communicating information among various components of the computing device 800.

Computing device 800 may have additional features/functionality. For example, computing device 800 may include additional storage such as removable storage 808 and non-removable storage 810 including, but not limited to, magnetic or optical disks or tapes. Computing device 800 may also contain network connection(s) 816 that allow the device to communicate with other devices. Computing device 800 may also have input device(s) 814 such as a keyboard, mouse, touch screen, etc. Output device(s) 812 such as a display, speakers, printer, etc. may also be included. The additional devices may be connected to the bus in order to facilitate communication of data among the components of the computing device 800. All these devices are well known in the art and need not be discussed at length here.

The processing unit 806 may be configured to execute program code encoded in tangible, computer-readable media. Tangible, computer-readable media refers to any media that is capable of providing data that causes the computing device 800 (i.e., a machine) to operate in a particular fashion. Various computer-readable media may be utilized to provide instructions to the processing unit 806 for execution. Example tangible, computer-readable media may include, but is not limited to, volatile media, non-volatile media, removable media and non-removable media implemented in any method or technology for storage of information such as computer readable instructions, data structures, program modules or other data. System memory 804, removable storage 808, and non-removable storage 810 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 806 may execute program code stored in the system memory 804. For example, the bus may carry data to the system memory 804, from which the processing unit 806 receives and executes instructions. The data received by the system memory 804 may optionally be stored on the removable storage 808 or the non-removable storage 810 before or after execution by the processing unit 806.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Figure 10A:
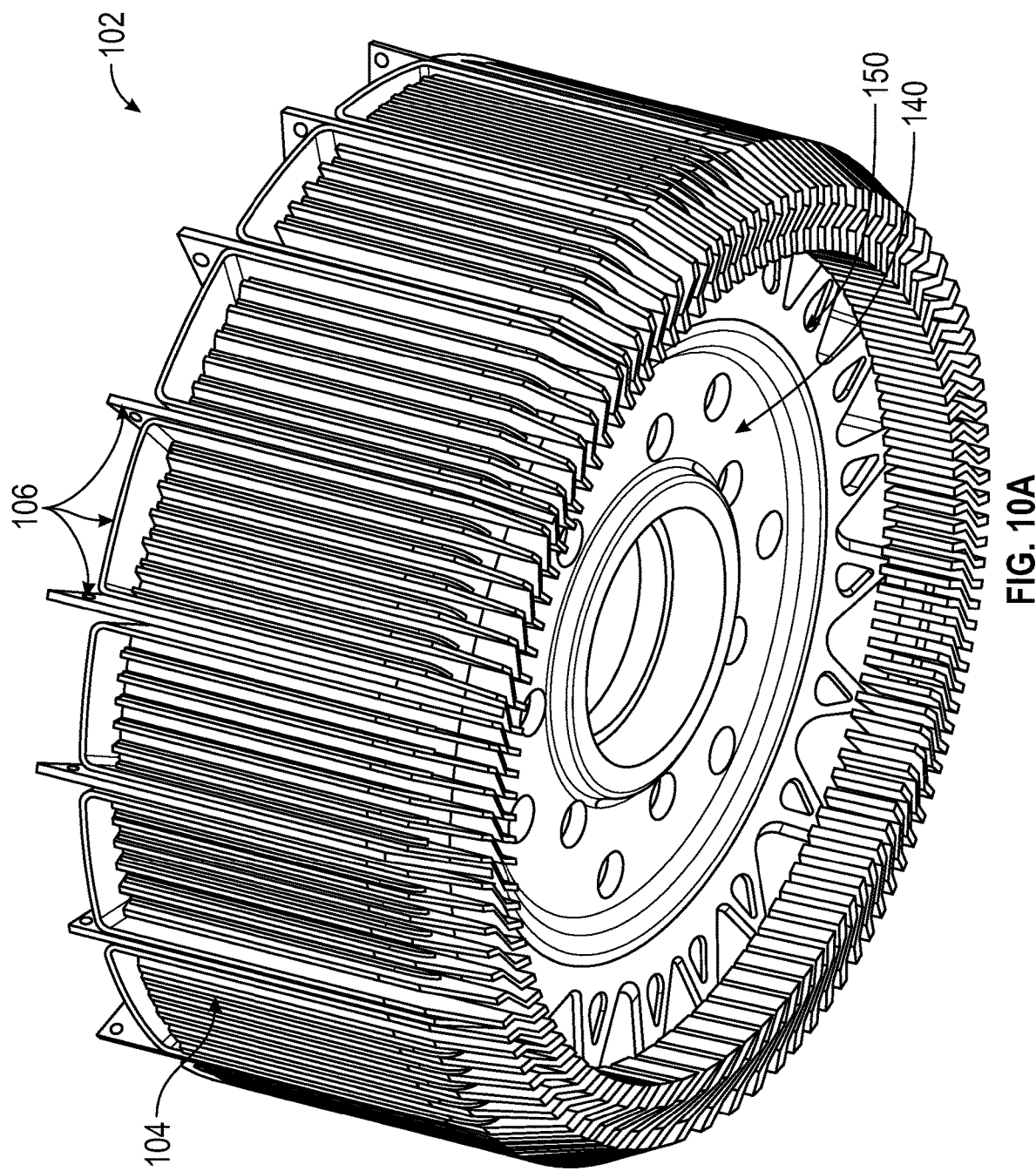
FIGS. 10A and 10B illustrate a computer-aided design (CAD) model of the stator of an electric machine (also referred to as "motor") designed around the tuned coil principle as described herein.
Figure 10B:
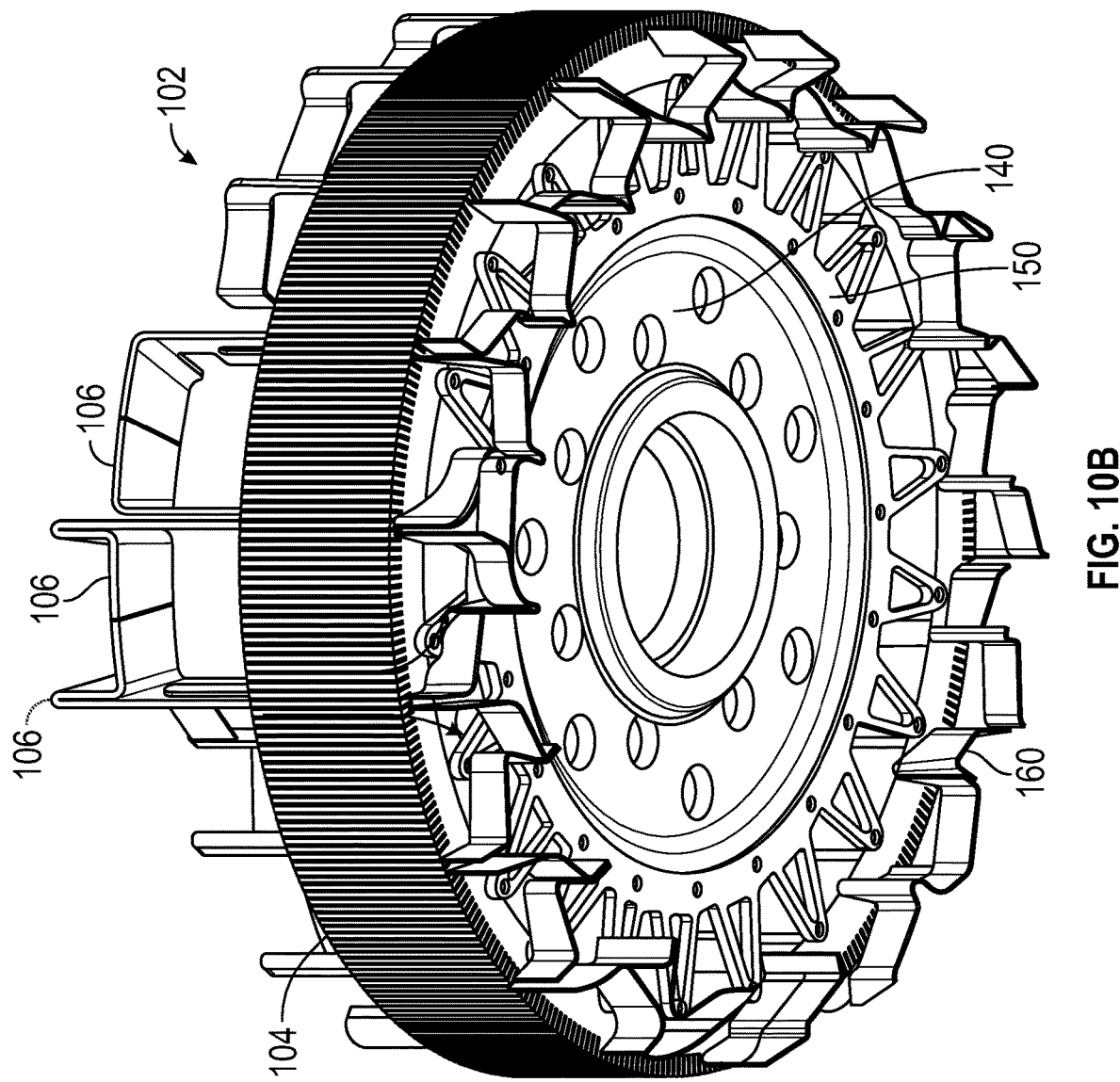

Referring now to FIGS. 10A-10D, an example electric machine is described. The electric machine was designed using the techniques described herein. This electric machine is able to match all the features of a high power high performance motor. FIGS. 10A and 10B illustrate a computer-aided design (CAD) model of the stator 102 of the electric machine (also referred to as "motor") designed around the tuned coil principle as described above. It should be understood that the stator 102 (internal) may be paired with an induction rotor such as external squirrel cage rotor, a permanent magnet (PM) rotor or any other suitable rotor configuration without any principal modifications to the topology and thus without any limitation to the type of motor.

This specific design uses only one conductor per slot with a six phase and a q=2 configuration (slots per pole per phase). It should be understood that q=2 configuration is provided only as an example and that other practical q number implementations such as q=1, q=3, q=4, etc. may be implemented. Additionally, as a specific solution for a high frequency motor, the magnetic core 104 is mounted insulated to the motor structure 140 via supports 150. The supports 150 are made from a nonmagnetic and nonconductive material. As a cost effective solution, such supports may be fabricated from a non-magnetic stainless steel (SST) and designed with spokes in order to minimize the eddy currents induced by the leakage flux. It should be understood that the supports 150 are made from a composite material able to provide the desired mechanical strength.

The stator windings 106 can be formed by an array of bobbins. A pair of bobbins is described above with regard to FIG. 3. There are only 2 types of half bobbins repeated evenly (i.e., 108 times in FIGS. 10A and 10B). The bobbins are relatively similar, having a narrow bar located in the slot and large frontal parts to carry the current outside of the slots. The narrow bar (e.g., first portion of stator winding) can be tuned. For a given frequency, the height of the bar inside the slot has only one optimum size. As described above, a taller or a short bar will generate more losses, hence the tuned aspect notion. As an example, the optimum size of an aluminum bar functioning at 750 Hz is around 6 mm, while a 6.5 mm or a 5.5 mm will have higher losses. The frontal parts (e.g., second portion of the stator winding) have less design constrains but their thickness should be not greater than the penetration depth, for example half of the penetration depth, albeit a thin frontal part may excessively extend axially and thus may introduce a toll on the shaft size and structure. Optionally, in one implementation, the cross section of the frontal part (e.g., second portion of stator winding) may be as much as 4-6 times bigger than the bar inside the slot (e.g., first portion of stator winding), thus the losses associated to the frontal parts may be highly diminished. Such bobbins may be stamped directly from a conductive sheet metal (e.g., copper, aluminum, etc.), making such technology highly cost effective. It should be understood that other fabrication technologies may be used as additive manufacturing (3D printing) or laser/water cutting without limitations. In order to obtain a full phase circuit, each frontal part ends with an enlarged part or a shoe (e.g., see FIG. 3) which is connected to the next half bobbins. The shoes of two successive half bobbins may be connected by welding, soldering, brazing, casting, riveting etc. without limitation to the technology. FIG. 10B illustrates the circuit of only one phase. As shown in FIG. 10B, the current in the frontal parts (e.g., second portion of stator winding) leaves the bars in opposite directions as shown by the arrows, thus minimizing the leakage reactance of the frontal parts by having the current of each phase flowing in opposite directions.

As shown in FIG. 10B, a connection 160 between half bobbins is shown. The connection 160 may be weldments or soldering cordons, for example. Although only one connection 160 is shown in FIG. 10B, it should be understood that all of the adjacent half bobbins are connected in order to create a functional stator winding 106. This disclosure also contemplates that the connection area may be easy accessed (e.g., by a welding head, laser optics, brazing torch, soldering iron, etc.) and are perfectly repetitive, thus connecting the half bobbins may be done by a robotized machine in a highly productive and fully automated fashion.

Figure 10C:
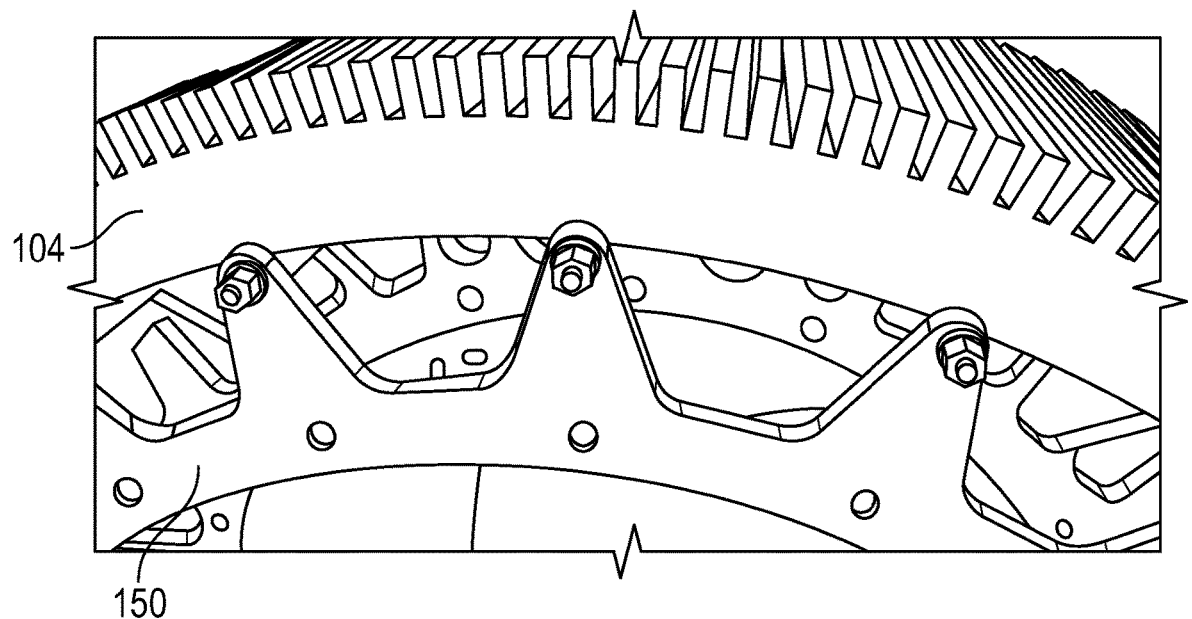
FIG. 10C illustrates mounting of the stator core to the support by means of bolts and nuts.
Figure 10D:
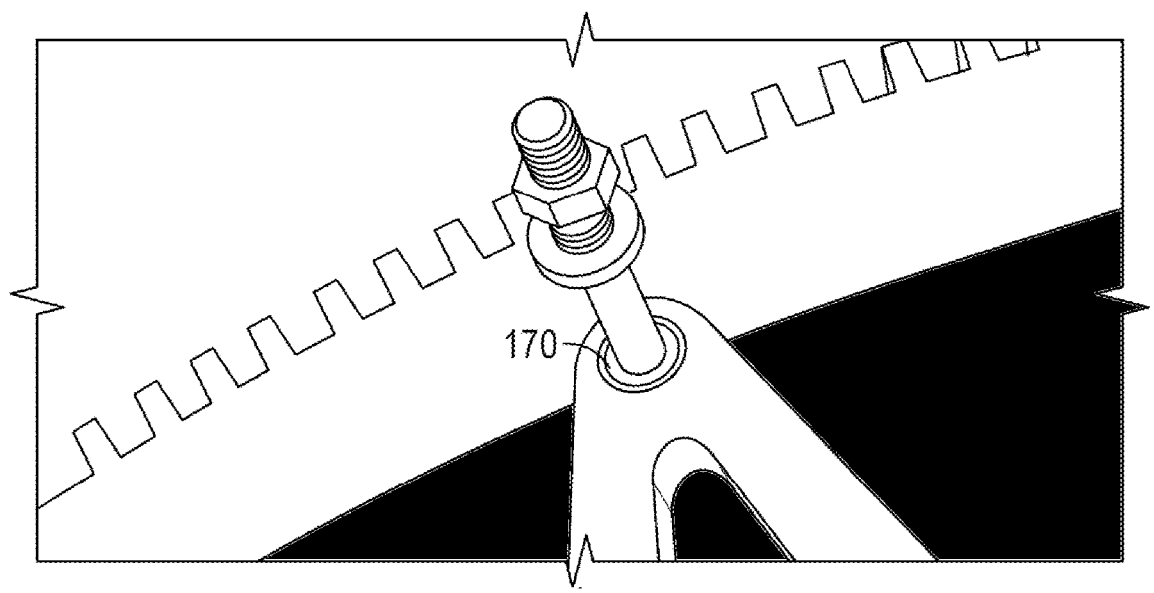
FIG. 10D illustrates the insulation mounting.

FIG. 10C illustrates mounting of the stator core 104 to the support 150 by means of bolts and nuts. Optionally, the supports can have different geometry in order to minimize eddy current losses and to compensate for the stack geometry variation. FIG. 10D illustrates the insulation mounting. The mounting consists in introducing a cylindrical hollow insulator 170 inside an array of halls designed on purpose in the lamination core. As such, the mounting bolts will not touch the core and will not create an electric loop.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. An electric machine, comprising:
   a rotor; and
   a stator, wherein the stator comprises a magnetic core and a stator winding, wherein the magnetic core comprises a plurality of teeth defining a plurality of slots between adjacent teeth, wherein the stator winding comprises a first portion arranged inside a slot and a second portion arranged outside the slot, wherein the first portion of the stator winding comprises a single layer per slot, and wherein a geometry of first portion of the stator winding is optimized for a power supply frequency.

2. The electric machine of claim 1, wherein the optimized geometry minimizes alternating current (AC) resistive loss of the electric machine.

3. The electric machine of claim 1, wherein the first portion of the stator winding comprises a plurality of layers, each layer having a different size.

4. The electric machine of claim 1, wherein the first portion of the stator winding comprises at least a first turn and second turn, wherein the second turn is thinner than the first turn.

5. The electric machine of claim 1, wherein a layer thickness of the first portion of the stator winding is greater than a layer thickness of the second portion of the stator winding.

6. The electric machine of claim 1, a cross section of the second portion of the stator winding is greater than a cross section of the first portion of the stator winding.

7. The electric machine of claim 1, wherein a layer thickness of the second portion of the stator winding is half of a current penetration depth.

8. The electric machine of claim 1, wherein a layer width of the first portion of the stator winding is less than a layer width of the second portion of the stator winding.

9. The electric machine of claim 1, wherein the slots between adjacent teeth are elongated.

10. The electric machine of claim 9, wherein a size of the slot accommodates the first portion of the stator winding.

11. The electric machine of claim 10, wherein a size of the elongated slots is one order of magnitude larger than an airgap.

12. The electric machine of claim 9, wherein the teeth extend radially outward with respect to the first portion of the stator winding.

13. The electric machine of claim 1, wherein the rotor is an induction rotor.

14. The electric machine of claim 1, further comprising a motor structure and a nonmagnetic support, wherein the non-magnetic support connects the motor structure to the magnetic core, and wherein the non-magnetic support is mounted to the magnetic core with an insulated coupler.

15. An electric machine, comprising:
    a rotor;
    a stator, wherein the stator comprises a magnetic core and a stator winding, wherein the magnetic core comprises a plurality of teeth defining a plurality of slots between adjacent teeth, wherein the stator winding comprises a first portion arranged inside a slot and a second portion arranged outside the slot, and wherein a geometry of first portion of the stator winding is optimized for a power supply frequency;
    a motor structure; and
    a nonmagnetic support, wherein the non-magnetic support connects the motor structure to the magnetic core, and wherein the non-magnetic support is mounted to the magnetic core with an insulated coupler.

16. The electric machine of claim 15, wherein a layer thickness of the second portion of the stator winding is half of a current penetration depth.

17. An electric machine, comprising:
    a rotor; and
    a stator, wherein the stator comprises a magnetic core and a stator winding, wherein the magnetic core comprises a plurality of teeth defining a plurality of slots between adjacent teeth, wherein the stator winding comprises a first portion arranged inside a slot and a second portion arranged outside the slot, wherein a geometry of first portion of the stator winding is optimized for a power supply frequency, wherein the first portion of the stator winding comprises at least a first turn and second turn, and wherein the second turn is thinner than the first turn.

18. The electric machine of claim 17, wherein a layer thickness of the second portion of the stator winding is half of a current penetration depth.

19. An electric machine, comprising:
    a rotor; and
    a stator, wherein the stator comprises a magnetic core and a stator winding, wherein the magnetic core comprises a plurality of teeth defining a plurality of slots between adjacent teeth, wherein the stator winding comprises a first portion arranged inside a slot and a second portion arranged outside the slot, wherein a geometry of first portion of the stator winding is optimized for a power supply frequency, and wherein a layer thickness of the first portion of the stator winding is greater than a layer thickness of the second portion of the stator winding.

20. The electric machine of claim 19, wherein a layer thickness of the second portion of the stator winding is half of a current penetration depth.

21. An electric machine, comprising:
    a rotor; and
    a stator, wherein the stator comprises a magnetic core and a stator winding, wherein the magnetic core comprises a plurality of teeth defining a plurality of slots between adjacent teeth, wherein the stator winding comprises a first portion arranged inside a slot and a second portion arranged outside the slot, wherein a geometry of first portion of the stator winding is optimized for a power supply frequency, and wherein a cross section of the second portion of the stator winding is greater than a cross section of the first portion of the stator winding.

22. The electric machine of claim 21, wherein a layer thickness of the second portion of the stator winding is half of a current penetration depth.

23. An electric machine, comprising:
a rotor; and
a stator, wherein the stator comprises a magnetic core and a stator winding, wherein the magnetic core comprises a plurality of teeth defining a plurality of slots between adjacent teeth, wherein the stator winding comprises a first portion arranged inside a slot and a second portion arranged outside the slot, wherein a geometry of first portion of the stator winding is optimized for a power supply frequency, and wherein a layer width of the first portion of the stator winding is less than a layer width of the second portion of the stator winding.

24. The electric machine of claim 23, wherein a layer thickness of the second portion of the stator winding is half of a current penetration depth.

* * * * *